United States Patent [19]
Kessler et al.

[11] Patent Number: 4,988,763

[45] Date of Patent: Jan. 29, 1991

[54] CATALYZED BULK PROCESS FOR PRODUCING CYCLIC ESTER-MODIFIED ACRYLIC POLYMERS

[75] Inventors: Lisa M. Kessler, Milwaukee County; Kevin M. Scholsky; Robert W. Stackman, both of Racine County, all of Wis.

[73] Assignee: S. C. Johnson & Son, Inc., Racine, Wis.

[21] Appl. No.: 186,515

[22] Filed: Apr. 26, 1988

[51] Int. Cl.$^5$ .............................................. C08E 8/00
[52] U.S. Cl. .................................. 525/61; 525/328.8; 525/386
[58] Field of Search ..................... 525/328.8, 386, 61

[56] References Cited

U.S. PATENT DOCUMENTS

| | | |
|---|---|---|
| 2,890,208 | 6/1959 | Young et al. |
| 3,169,945 | 2/1965 | Hostettler et al. |
| 3,284,417 | 11/1966 | Hostettler et al. |
| 3,654,347 | 4/1972 | Kincaid et al. |
| 3,760,034 | 9/1973 | Critchfield et al. |
| 3,892,714 | 7/1975 | Sampson et al. |
| 4,005,155 | 1/1977 | Sampson et al. |
| 4,082,816 | 4/1978 | Fish et al. |
| 4,175,177 | 11/1979 | Potts . |
| 4,281,087 | 7/1981 | Heuschen et al. |
| 4,368,320 | 1/1983 | Aldinger et al. |
| 4,412,061 | 10/1983 | Wu et al. |
| 4,414,370 | 11/1983 | Hamielec et al. |
| 4,435,542 | 3/1984 | Watanabe et al. |
| 4,504,635 | 3/1985 | Weber, Jr. et al. |
| 4,521,570 | 6/1985 | Watanabe et al. |
| 4,529,787 | 7/1985 | Schmidt et al. |
| 4,529,788 | 7/1985 | Asami et al. |
| 4,546,046 | 10/1985 | Etzell et al. |
| 4,546,160 | 10/1985 | Brand et al. |

FOREIGN PATENT DOCUMENTS

| | | |
|---|---|---|
| 0003846 | 8/1970 | European Pat. Off. |
| 0108373 | 1/1985 | European Pat. Off. |
| 54-125232 | 9/1979 | Japan . |
| 1443073 | 7/1976 | United Kingdom . |

OTHER PUBLICATIONS

Theodore et al, *Journal of Coatings Technology*, vol. 54, No. 693, Oct. 1982, p. 77, "Modification of Acrylic Polymers for High Solids Coatings".

Kricheldorf et al, "Polyacetones, 1, Copolymerization of Glycolide and e-Caprolactone, " *Macromolecules*, vol. 17, No. 10, 1984, pp. 2173-2181.

Shiota et al, Journal of Applied Polymer Science, vol. 11, pp. 773-790 (1967).

Shiota et al, Journal of Applied Polymer Science, vol. 12, pp. 2441-2461 and 2463-2480 (1968).

*Primary Examiner*—Bernard Lipman

[57] ABSTRACT

A bulk process for the formation of hydroxyl-containing polymeric compositions comprising the reaction in the presence of a Lewis acid catalyst of a hydroxyl group containing ethylenic polymer with a cyclic ester in the absence of a solvent is described. The compositions have enhanced film-forming characteristics including flexibility, resistance to corrosion, and the like.

7 Claims, No Drawings

CATALYZED BULK PROCESS FOR PRODUCING CYCLIC ESTER-MODIFIED ACRYLIC POLYMERS

FIELD OF INVENTION

This invention relates to a catalyzed bulk process for producing cyclic ester-modified polymers and to the polymers produced. More particularly, the invention relates to the reaction of a cyclic ester as a lactone, lactide, or the like with an addition polymer carrying hydroxyl functionality on the backbone of the polymer. The process is carried out at a 100% polymer solids content, i.e., in the absence of solvent.

BACKGROUND OF INVENTION

Polymers based on the reaction of hydroxyl-containing vinyl monomers, such as the hydroxyl acrylates, with lactones are known. Because of their good film-forming and other characteristics, these polymers are becoming fairly widely accepted in industry. Specifically, Sampson et al, U.S. Pat. No. 3,892,714 discloses hydroxy copolymers reacted with a lactone and, thereafter, crosslinked with a polyisocyanate. According to the patent disclosure, ethylenically unsaturated monomers, at least one containing hydroxyl groups, are polymerized in the presence of a solvent. The solvent preferably should not contain hydroxyl groups. Thereafter, a lactone is reacted with the resultant hydroxyl-containing polymer in the presence of a catalyst and solvent.

Fisk et al, U.S. Pat. No. 4,082,816 discloses caprolactone-modified acrylic polymers obtained by polymerizing a mixture of vinyl monomers, at least one monomer containing a carboxyl or hydroxyl group, with caprolactone. The reaction is carried out in the presence of a free radical catalyst and a Lewis acid catalyst in the presence of a solvent.

*The Journal of Coatings Technology*, Vol. 54, No. 693, October 1982, at page 77, in an article by Theodore et al entitled "Modification Of Acrylic Polymers For High Solids Coatings," discloses the reaction of a hydroxyl acrylic polymer with epsilon-caprolactone. According to the article, the hydroxyl-containing acrylic polymer is reacted with the lactone in the presence of a solvent and dibutyltin oxide catalyst.

Aldinger et al, U.S. Pat. No. 4,368,320 discloses acrylic or methacrylic resins containing hydroxyl groups modified with epsilon-caprolactone. In the formation of the resins, an adduct of a hydroxyalkylacrylate or methacrylate and epsilon-caprolactone is formed in a first step, and then in a second step the intermediate product is further copolymerized with acrylic acid or methacrylic acid esters and optionally vinyl aromatics in a suitable varnish solvent.

Weber, Jr. et al, U.S. Pat. No. 4,504,635 discloses a process where a monomer is formed from, for example, a hydroxyethyl acrylate and a lactone. This monomer is further reacted in the presence of a catalyst and solvent, for example with a diacrylate and optionally additional lactone.

According to the all of the aforesaid disclosures, the reaction products are formed in the presence of a solvent and a catalyst. Before the products can be used, for example, in the formation of crosslinked thermosetting resins of the type used in coating compositions, it is often necessary to remove the solvent. Additionally, since the products are prepared in a solvent medium, the equipment used in the polymer-forming process can be relatively complex. Therefore, there are distinct advantages to preparing the polymer in the bulk, if possible.

In a commonly assigned, related concurrently filed application Ser. No. 186,266 of Kathleen J. Bixler, Lisa M. Kessler, Kevin M. Scholsky, and Robert W. Stackman entitled "Bulk Process For Producing Cyclic Ester-Modified Polymers Without Use Of Catalyst," there is described a bulk process for producing cyclic ester-modified polymers in the absence of a catalyst. The products of that application have enhanced characteristics in relation to polymers produced in the presence of a solvent and with the prior art catalysts. The reaction, however, in the absence of a catalyst while being practical for most applications is relatively slow and requires temperatures, depending upon the component selected, of up to about 300° C. An advantage would be obtained, therefore, if the reaction rates could be increased and at lower temperatures provided this was accomplished without adversely affecting the film-forming characteristics of coating compositions containing the products of the invention due to the presence of ionic species.

SUMMARY OF INVENTION

It has been found according to the present invention that unique film-forming components are formed through the reaction of hydroxyl group containing vinyl polymers, such as the acrylic polyols, and cyclic esters with the reaction being carried out at 100% solids utilizing a select catalyst. The select catalyst causes the reaction to proceed at a lower temperature than possible when the reaction proceeds without a catalyst and at a faster rate. Surprisingly, Lewis acid catalysts such as $BF_3$ etherate, tetrabutyl-titanate, zinc chloride, stannous chloride, aluminum isoproperoxide, zinc acetate, and mixtures thereof do not adversely affect the film characteristics of a thermosetting resin based on the film-forming component.

Specifically, vinyl polymers, such as the acrylate polymers, having reactive hydroxyl functionality carried on the backbone of the polymer are heated to temperatures ranging from about 180° C to about 250° C in bulk, and a cyclic ester such as epsilon-caprolactone is added batchwise or dropwise over a period of time. The reaction time will vary from about less than one minute to about four hours depending upon reaction temperature, quantity of cyclic ester added, and the melt viscosity of the precursor resin. The reaction will proceed smoothly without gel formation to produce a cyclic ester-modified hydroxy moiety containing polymer. The acrylate functionality can provide to the polymer composition a rigid, hydrocarbon backbone which increases hardness values obtained when crosslinked with, for example, melamine or a polyisocyanate. The cyclic ester, such as epsilon-caprolactone, provides flexible side chains with terminal hydroxyl groups off of the main chain. This results in an oligomer with a unique combination of both hard inflexible units and softer flexible side chains. The unique combination of producing the product in bulk, i.e., in the absence of solvent, and in the presence of select catalyst, provides a process superior to those utilizing solvents. As a result of the lower reaction temperatures and faster reaction times in comparison to having no catalyst present, the film-forming products based on the novel resin component of this invention are substantially free of color.

Additionally, a greater variety of reactors can be employed since solvents, which increase the volume of the reaction, are not utilized.

GENERAL DESCRIPTION OF INVENTION

The present invention comprises providing a vinyl polymer component such as the polyacrylates carrying reactive hydroxyl functionality on the backbone of the polymer and a suitable compatible cyclic ester, such as epsilon-caprolactone; and reacting the polymer component and the lactone component in bulk in the presence of a Lewis acid catalyst such as $BF_3$.etherate, tetrabutyl-titanate, zinc chloride, stannous chloride, aluminum isopropoxide, zinc acetate, and mixtures thereof to provide a reaction product having characteristics not obtained through the reaction of the polymer component and cyclic ester in the presence of a solvent. The process for preparing the polymer compositions of the invention can be carried out in a variety of reactors either in batch, semi-batch, or continuous operations.

Polymer Component of Invention

It is critical that the polymer component of the invention contain hydroxyl functionality along the backbone of the polymer for reaction with the cyclic ester component. Addition polymers which can be used according to this invention are disclosed in commonly assigned U.S. Pat. Nos. 4,414,370; 4,529,787, and 4,546,160, the disclosures thereof being incorporated herein by reference. More particularly, the '370 patent discloses styrene and acrylic acid copolymers made by bulk thermal initiation which have a low weight average molecular weight and having a relatively high number average molecular weight. The process produces resins having relatively high aromatic content, making the resins particularly suitable for use in high solids coatings;

the '787 patent discloses aromatic/acrylate polymers manufactured in a bulk initiated process wherein the process utilizes a polymerization initiator in the presence of low solvent levels to produce polymers having a narrow molecular weight distribution and a low chromophore content. These polymers have a number average molecular weight of from about 500 to 6000, a polydispersity of less than about 2.5, and a dispersion index of less than about 4.5. The polymers, because of their low chromophore content, are particularly useful in protective coatings including floor polishes;

the '160 patent discloses a continuous bulk polymerization process for producing polymers having a number average molecular weight of about 1000 to about 2500, a polydispersity of less than about 3, a dispersion index of up to about 5, and a low chromophore content.

As will be apparent, it is essential that the monomer component useful in the processes of the aforesaid patents be selected so as to provide the hydroxyl functionality essential to the present invention.

Polymers which can be used according to this invention, in addition to those described in the aforesaid patents, include homo- and copolymers of monomers obtained through solution reaction having only one reactive site of ethylenic unsaturation per molecule, with there being at least one monomer present which will provide hydroxyl functionality.

The preferred hydroxyl-containing monomers for producing the polymers of the invention include 2-hydroxyethyl acrylate, 3-chloro-2-hydroxypropyl acrylate, 2-hydroxybutyl acrylate, 6-hydroxyhexyl acrylate, 2-hydroxymethyl methacrylate, 2-hydroxypropyl methacrylate, 6-hydroxyhexyl methacrylate, 5,6-dihydroxyhexyl methacrylate, and the like. It is to be understood that although monomers can be used according to this invention which are free of hydroxyl functionality, at least one monomer must be present to provide the necessary hydroxyl functionality on the backbone of the polymer for reaction with the cyclic ester. The hydroxyl functionality containing monomer can comprise from about 0.1 to 100%, and preferably from 10 to 40%, of the total monomer making up the polymer.

The non-hydroxyl modifying monomers which can be used herein include the acrylate esters such as the (meth)acrylate esters such as methyl methacrylate, ethyl (meth)acrylate, n-propyl (meth)acrylate, n-butyl (meth)acrylate, isopropyl (meth)acrylate, isobutyl (meth)acrylate, n-amyl (meth)acrylate, n-hexyl (meth)acrylate, isoamyl (meth)acrylate, 2-hydroxyethyl (meth)acrylate, 2-hydroxypropyl (meth)acrylate, N,N-dimethylaminoethyl (meth)acrylate, N,N-diethylaminoethyl (meth)acrylate, t-butylaminoethyl (meth)acrylate, 2-sulfoethyl (meth)acrylate, trifluoroethyl (meth)acrylate, benzyl (meth)acrylate, 2-n-butoxyethyl (meth)acrylate, 2-chloroethyl (meth)acrylate, sec-butyl (meth)acrylate, tert-butyl (meth)acrylate, 2-ethylbutyl (meth)acrylate, cinnamyl (meth)acrylate, cyclohexyl (meth)acrylate, cyclopentyl (meth)acrylate, 2-ethoxyethyl (meth)acrylate, furfuryl (meth)acrylate, hexafluoroisopropyl (meth)acrylate, 3-methoxybutyl (meth)acrylate, 2-methoxybutyl (meth)acrylate, 2-nitro-2-methylpropyl (meth)acrylate, n-octyl-(meth)acrylate, 2-ethylhexyl (meth)acrylate, 2-phenoxyethyl (meth)acrylate, 2-phenylethyl (meth)acrylate, phenyl (meth)acrylate, propargyl (meth)acrylate, tetrahydrofurfuryl (meth)acrylate, and tetrahydropyranyl (meth)acrylate. As used herein, "meth" in parentheses before acrylic or acrylate is used to designate either the methacrylic or acrylic compound. Other non-hydroxyl group containing monomers which can be used include ethylenic monomers such as vinyl acetate, vinyl pyridine, vinyl pyrollidone, methyl crotonate, and the like.

Other addition polymers useful according to this invention include poly(vinylalcohol) and polymers which carry carboxyl groups with the carboxyl groups being end capped with monoepoxides to provide hydroxyl functionality.

Cyclic Ester Component of Invention

The cyclic ester used in this invention can be any cyclic ester or combination of cyclic esters, preferably having four or more carbon atoms in the ring which will undergo a ring-opening reaction. Specifically, the cyclic esters used in the process of this invention preferably will have the general formula

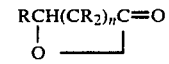

wherein n is at least one, at least n+1R are hydrogen, the remainder of the R's are hydrogen, alkyl, cycloalkyl, alkoxy or single ring aromatic hydrocarbon radicals. Unsubstituted epsilon-caprolactone, in which n is four and all the R's are hydrogen, is a highly preferred material. The substituted epsilon-caprolactones also preferred for use herein are the various monoalkyl epsilon-caprolactones such as the monomethyl-, monoethyl-, monopropyl-, monoisopropyl-, etc., to monododecyl epsilon-caprolactones; dialkyl epsilon-caprolactones in which the two alkyl groups are substituted on the same or different carbon atoms, but not both on the epsilon carbon atom; trialkyl epsilon-caprolactones in which two or three carbon atoms in the cyclic ester ring are substituted, so long as the epsilon carbon atom is not disubstituted; alkoxy epsilon-caprolactones such as methoxy and ethoxy epsilon-caprolactones; and cycloalkyl, aryl, and aralkyl epsilon-caprolactones such as cyclohexyl, phenyl and benzyl epsilon-caprolactones.

Other cyclic esters useful herein having at least one ring-openable inner ester bond include gamma-butyrolactone, gamma-valerolactone, ethylene carbonate, tetramethylene carbonate, 2,2-dimethyl-4-phenyl-1,3-dioxolan-5-one, alpha-n-propyl-delta-valerolactone, delta,delta-dimethyl-delta-valerolactone, 3-ethyl-1,4-dioxan-2-one, 3,3,6-trimethyl-1,4-dioxane-2-one, tetramethyl glycolide, tetraphenyl glycolide, 3-oxa-epsilon-caprolactone, beta-propiolactone, alpha,alpha-bis(chloromethyl)propiolactone, beta-butyrolactone, pivalolactone (PVL), thio-butyrolactone (TBL), delta-valerolactone (DVL), alpha,beta,gamma-trimethoxy-delta-valerolactone, 1,4-dithiane-2,5-dione, trimethylene carbonate, neopentyl carbonate, ethylene oxalate, beta-methyl-epsilon-isopropyl-epsilon-caprolactone, propylene oxalate, lactones of 4-hydroxycyclohexanecarboxylic acid, cis-disalicylide, di-o-cresotide, and trisalicylide, as well as combinations of the above. Preferred cyclic ester molecules having at least one ring-openable inner ester bond include gamma-butyrolactone, delta-valerolactone, pivalolactone, thio-butyrolactone, beta-butyrolactone, epsilon-caprolactone, and mixtures thereof.

The Select Catalyst

As stated hereinbefore, the catalyst for use herein is a Lewis acid catalyst such as BF$_3$.etherate, tetrabutyltitanate, zinc chloride, stannous chloride, aluminum isopropoxide, zinc acetate, and mixtures thereof. Surprisingly, it has been found that these select catalysts, while increasing the reaction rate and allowing for lower temperatures, do not adversely affect the film characteristics of products based on the products of this invention when used with a crosslinking agent such as melamine. The shorter reaction times at lower temperatures eliminate undesirable intermolecular transesterification reactions and the formation of color bodies. Moreover, the select catalysts do not introduce harmful ionic species when used within the range of 0.05–1.0% by weight based on the combined weight of polymer and cyclic ester components. It has been found that higher ranges of catalyst will either not substantially influence the reaction rate or will cause detrimental effects. Lower levels of catalyst will not provide a noticeable change in rate or lower the temperature of reaction. The optimum catalyst level is from about 0.0001–1.0% by weight based on the combined weight of polymer and cyclic ester components.

Reaction Of Polymer And Cyclic Ester Components

The reaction of the polymer component and cyclic ester component is carried out in bulk at temperatures of from about 100° C to 300° C, and preferably at a temperature of from about 210° to 222° C. The temperature selected will be governed by the decomposition temperature of the polymer component. Since the reaction is carried out in bulk without solvent, it is essential that the polymer component and the cyclic ester component are selected so that they are completely miscible in melt form, or rapidly become miscible on reaction. If the polymer component and cyclic ester component are immiscible, a homogeneous reaction product will not be obtained.

The reaction between the hydroxyl group of the polymer component and the cyclic ester is through ring-opening of the cyclic ester between the —C=O and —O—, with the cyclic ester adding to the polymer component without formation of water or other by-product. The reaction of, for example, epsilon-caprolactone and the hydroxyl component wherein P is the polymer moiety is as follows:

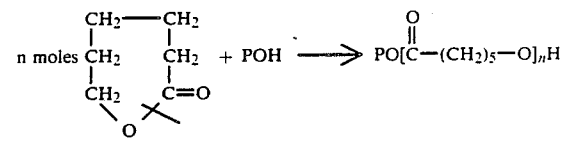

It is to be understood that there may be some homopolymerization of the cyclic ester component under the conditions of the reaction. Accordingly, the cyclic ester can be present in an amount of from about 0.1 to 10 moles of the cyclic ester per mole of hydroxyl group on the polymer component, with the optimum amounts being from about 0.5 to 5 moles of the cyclic ester per mole of hydroxyl group on the polymer component. The temperature of the reaction can be varied within the above range to effect and control the rate and extent of reaction of the cyclic ester with the polymer component. Variations in the amount of cyclic ester will effect the flexibility and hardness of the finally cured film. Variation in catalyst level will influence the rate of reaction at a given temperature. Since the reaction is carried out in bulk, the equipment used in the polymerization process can vary substantially. Thus, the reactors utilized can be designed for batch, semi-batch or continuous operations, and include glass-lined reactors, screw-type reactors, pressure reactors, depending on the reaction temperature, and the like. Since there is no solvent present, the reactors can be much smaller and more compact relative to the reactors utilized when a solvent is present and can operate at substantially lower pressures.

Use Of The Reaction Products Of The Polymer Component And Cyclic Ester

The compositions formed by the process of the present invention are polymeric compositions having a molecular weight and crosslinking capability which can be controlled based on the selection of polymer and cyclic ester components and reaction time. The composition will have on the molecule reactive hydroxyl groups which will cause the compositions to crosslink with commercially available crosslinking agents such as melamine, polyisocyanates, amino condensation products, and the like. Since the product is formed in bulk, it is not necessary to strip solvent from the reaction product prior to use. Additionally, the select catalysts utilized do not adversely influence the color or other characteristics of the compositions. Accordingly, the compositions can be used in special applications such as in decorative finishes, automotive coatings, and the like. The products of the invention have excellent application in the fabrication of liquid and powder protective coatings, paint binders, graphic arts inks, adhesives, floor polish ingredients, plastics additives, pigment-dispersant resins, curing materials in reinforced or composite plastics materials, components for reaction injection molding systems, and the like. The products can be tailored to a particular need as a result of the high degree of hydroxyl functionality contained on the compositions.

DETAILED DESCRIPTION OF PRESENTLY PREFERRED EMBODIMENTS

Having described the invention in general terms, the following detailed examples are set forth to further illustrate the invention. Parts and percentages are by weight unless otherwise indicated.

EXAMPLE 1

In this example the polymer component is an addition copolymer containing reactive hydroxyl groups comprising 33% styrene, 33% hydroxyethyl methacrylate, and 34% 2-ethylhexyl acrylate. The copolymer has an hydroxyl value of 142. The cyclic ester component is epsilon-caprolactone. The catalyst is zinc chloride.

220.7 grams of the polymer component is charged to a four-neck round-bottom flask. The center neck is fitted with an agitator, one side neck is fitted with a nitrogen gas inlet and one side neck is fitted with a thermometer. The final side neck is fitted with a removable ground glass stopper to permit addition of materials. The polymer component is heated with agitation to a temperature of 215° C until the system is fully fluid. Thereafter, the ground glass stopper is removed from the side neck and 71.3 grams epsilon-caprolactone is slowly added, followed by addition of 0.209 grams zinc chloride catalyst, with the temperature being maintained at approximately 215° C. The reaction temperature is stabilized at 215° C and allowed to proceed for 30 minutes. There is 98.5% conversion of the lactone as determined by gas chromatography (GC). The polymer was then analyzed by gel permeation chromatography (GPC) and found to have a number-average molecular weight (Mn) of 1900, a weight-value molecular weight (Mw) of 4900, a sedimentation-value molecular weight (Mz) of 4460, and polydispersity and related value ratios of Mw/Mn=2.62 and Mz/Mn=6.14.

EXAMPLE 2

A procedure similar to that of Example 1 was used in this Example 2. 250.0 grams of the polymer component of Example 1 was used. 77.0 grams of epsilon-caprolactone was used, and 0.253 grams stannous chloride was used. The reaction temperature was also 215° C. After a five-minute reaction time, the lactone was 99.2% converted, as analyzed by GC. The molecular weight distribution of the polymer is as follows: Mn=1770, Mw=3690, Mz=7100, Mw/Mn=2.16, and Mz/Mn=4.16.

EXAMPLE 3

A procedure similar to that of Example 1 was used in this Example 3. 279.4 grams of the polymer component of Example 1 was used. 85.5 grams epsilon-caprolactone was used, and 0.306 grams aluminum isopropoxide catalyst. The reaction temperature was 215° C. After a 30 minute reaction time, the lactone was 98.4% converted, as analyzed by GC. The molecular weight distribution of the polymer is as follows: Mn=1700, Mw=3730, Mz=7830, Mw/Mn=2.10, and Mz/Mn=4.42.

EXAMPLE 4

A procedure similar to that of Example 1 was used in this Example 4. 217.0 grams of the polymer component of Example 1 was used. 64.8 grams epsilon-caprolactone was used, and 0.190 grams BF$_3$.etherate. The reaction temperature was 215° C. After a 30 minute reaction time, the lactone was 97.8% converted, as analyzed by GC. The molecular weight distribution of the polymer is as follows: Mn=1940, Mw=5590, Mz=17070, Mw/Mn=2.88, and Mz/Mn=8.81.

EXAMPLE 5

A procedure similar to that of Example 1 was used in this Example 5. The polymer component has the following composition: 16.5 styrene, 21.5 methyl methacrylate, 30.0 butylacrylate, and 32.0 hydroxyethyl methacrylate. 155.0 grams polymer component was used. 97.7 grams epsilon-caprolactone was used, and 0.223 grams zinc acetate. The reaction temperature was 215° C. After a 30-minute reaction time, the lactone was 97.4% converted, as analyzed by GC. The molecular weight distribution of the polymer is as follows: Mn=1960, Mw=4110, Mz=7480, Mw/Mn=2.09, Mz/Mn=3.96.

EXAMPLE 6

A procedure similar to that of Example 1 was used in this Example 6. The polymer component has the following composition: 19.0 styrene, 3.0 alphamethyl styrene, 19.0 hydroxyethyl methacrylate, 39.0 methyl methacrylate, and 20.0 hydroxyethyl methacrylate. 202.0 grams polymer component was used. 72.4 grams epsilon-caprolactone, and 0.021 grams tetrabuty-titanate was used. The reaction temperature was 215° C. After a five-minute reaction time, the lactone was 98.4% converted, as analyzed by GC. The molecular weight distribution of the polymer is as follows: Mn=3830, Mw=25930, Mz=57040, Mw/Mn=6.71, Mz/Mn=14.81.

EXAMPLE 7

A procedure similar to that of Example 1 was used in this Example 7. 212.8 grams of the polymer component described in Example 6 was used. 77.3 grams epsilon-caprolactone and 0.101 grams zinc chloride was added. The reaction temperature was 215° C. After a 30-minute reaction time, the lactone was 97.9% converted, as analyzed by GC. The molecular weight distribution of the polymer is as follows: Mn=4700, Mw=22200, Mz=44040, Mw/Mn=4.73, Mz/Mn=9.36.

EXAMPLE 8

A procedure similar to that of Example 1 was used in this Example 8. 405.3 grams polymer component described in Example 6 was used. 145.9 grams epsilon-caprolactone and 0.238 grams stannous chloride were used. The reaction temperature was 215° C. After five minutes, the lactone was 99.1% converted, as analyzed by GC. The molecular weight distribution of the polymer is as follows: Mn=4770, Mw=22400, Mz=44340, Mw/Mn=4.70, and Mz/Mn=9.28.

EXAMPLE 9

In this example the polymer component is an addition copolymer containing reactive hydroxyl groups comprising 33% hydroxyethyl methacrylate, 34% 2-ethylhexyl acrylate and 33% styrene. The copolymer has a hydroxyl value of 142. The lactone component is delta-valerolactone (DVL). The catalyst is boron trifluoride etherate. 72.3 grams of the polymer component and 18.4 grams of DVL are charged to a four-necked round-bottom flask and stirred, followed by the addition of 0.063 grams of boron trifluoride etherate. The center neck is fitted with an agitator, one side neck is fitted with a nitrogen gas inlet and a thermometer, and one side neck is fitted with a reflux condenser. The final neck is fitted with a removable ground glass stopper to permit removal of aliquots for analysis. The mixture is heated with agitation to a temperature of 220° C until the polymer component is fully fluid. The reaction then proceeds for 150 minutes. The resultant polymer composition is removed from the flask and is analyzed by gas chromatography (GC) and gel permeation chromotography (GPC). 62.6% of the DVL is converted after the 150-minute reaction time. The polymer has a number-average molecular weight (Mn) of 1910, a weight-average molecular weight (Mw) of 11,500, a sedimentation-value molecular weight (Mz) of 46,000, a polydispersity (Mw/Mn) of 6.0, and a related value (Mz/Mn) of 24.1.

EXAMPLE 10

In this example the polymer used is the polymer used in Example 9. The lactone component is beta-butyrolactone (BBL). The catalyst is boron trifluoride etherate. 72.3 grams of the polymer component and 15.8 grams of BBL are charged to the reactor described in Example 1 and stirred, followed by the addition of 0.063 grams of boron trifluoride etherate. The mixture is heated with agitation to a temperature of 220° C until the polymer component is fully fluid. The reaction then proceeds for 15 minutes. The resultant polymer composition is removed from the flask and is analyzed by gas chromatography (GC) and gel permeation chromotography (GPC). 100% of the BBL is converted after the 15-minute reaction time. The polymer has a number-average molecular weight (Mn) of 1390, a weight-average molecular weight (Mw) of 3200, a sedimentation-value molecular weight (Mz) of 8000, a polydispersity (Mw/Mn) of 2.3, and a related value (Mz/Mn) of 5.8.

EXAMPLE 11

In this example the polymer used is the polymer used in Example 9. The lactone component is pivalolactone (PVL). The catalyst is boron trifluoride etherate. 72.3 grams of the polymer component and 18.4 grams of PVL are charged to the reactor described in Example 1 and stirred, followed by the addition of 0.063 grams of boron trifluoride etherate. The mixture is heated with agitation to a temperature of 220° C until the polymer component is fully fluid. The reaction then proceeds for 30 minutes. The resultant polymer composition is removed from the flask and is analyzed by gas chromatography (GC) and gel permeation chromotography (GPC). 98.9% of the PVL is converted after the 30-minute reaction time. The polymer has a number-average molecular weight (Mn) of 1600, a weight-average molecular weight (Mw) of 4900, a sedimentation-value molecular weight (Mz) of 15,500, a polydispersity (Mw/Mn) of 3.1, and a related value (Mz/Mn) of 9.9.

EXAMPLE 12

In this example the polymer component is 75% hydrolyzed poly(vinylalcohol). The lactone component is epsilon-caprolactone. The catalyst is boron trifluoride etherate. 35 grams of the polymer component and 67.9 grams of CAP are charged charged to a four-necked round-bottom flask and stirred, followed by the addition of boron trifluoride etherate. The center neck is fitted with an agitator, one side neck is fitted with a nitrogen gas inlet and thermometer, and one side neck is fitted with a reflux condenser. The final neck is fitted with a removable ground glass stopper to permit removal of aliquots for analysis. The mixture is heated with agitation to a temperature of 220° C until the polymer component is fully fluid. The reaction then proceeds for 30 minutes. The analysis of the resultant polymer composition established that the lactone component was substantially fully converted.

EXAMPLE 13

25.0 grams of polyol polymer produced in accordance with Example 7 was dispersed in 17.8 grams methylamyl ketone and formulated into a thermosetting film as follows: 4.39 grams of melamine was added to the polymer-containing solution, together with about 0.146 grams para-toluenesulfonic acid. The melamine functions as the polymer-curing ingredient, and the acid functions as a catalyst. After mixing for 60 minutes, the polymer was applied to a cold-rolled steel substrate, and then baked at a temperature of 150° C for 15 minutes. During this baking step, substantially all of the solvent present in the curing polymer was driven off, thereby forming a film having a thickness of about 1.5 mils. Such a film exhibited a reverse-impact resistance of 120 inches per pound, a Konig hardness of 126, and a pencil hardness of 2H. (See, e.g., ASTM Testing Procedure Nos. D2794-84 and D3363-74.)

EXAMPLE 14

25.0 grams of the polyol polymer produced in accordance with Example 8 was formulated into a thermoset film, as described in Example 9. The final melamine-cured film exhibited a reverse-impact resistance of 96 inches per pound, a direct-impact resistance of 112 inches per pound, a Konig hardness of 123, and a pencil hardness of 2H.

In the examples the polymers utilized can be replaced by other polymers as long as the polymer has the requisite critical characteristics of hydroxyl functionality. Further, the cyclic ester component of the examples can be replaced with other cyclic esters having the characteristics defined previously. The catalyst can be replaced with others of the select group of catalysts. By the judicious selection of the polymer, lactone components and catalyst, products can be tailored to have characteristics for a particular application.

As will be apparent to one skilled in the art, various modifications can be made within the scope of the aforesaid description. Such modifications being within the ability of one skilled in the art form a part of the present invention and are embraced by the appended claims.

It is claimed:

1. Bulk process for reacting at a temperature of from 100°–300° C for a period of from less than one minute to six hours in the presence of a Lewis acid catalyst selected from the group consisting of $BF_3$.etherate, tetrabutyl-titanate, zinc chloride, stannous chloride, aluminum isoproperoxide, zinc acetate and mixtures thereof, a polymer component which is a member of the group consisting of a polyacrylate containing hydroxyl alkyl moieties, a poly(vinyl alcohol) containing reactive hydroxyl groups and mixtures thereof, with a cyclic ester component having the formula

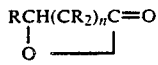

wherein n is at least one, at least n+1R are hydrogen, and the remainder of the R's are hydrogen, alkyl, cycloalkyl, alkoxy or single ring aromatic hydrocarbon radicals; said cyclic ester component being present in an amount of from 0.1 to 10 moles per mole of hydroxyl group on said polymer component and being selected to be substantially miscible with the polymer component at the conditions of the reaction, said process being carried out without use of a solvent.

2. The process according to claim 1 wherein the lactone is epsilon-caprolactone.

3. The process according to claim 1 wherein the cyclic ester is delta-valerolactone.

4. The process according to claim 1 wherein the cyclic ester is beta-butyrolactone.

5. The process according to claim 1 wherein the cyclic ester is pivalolactone.

6. The process according to claim 1 wherein the temperature of reaction is from about 210°–250° C.

7. The process according to claim 1 wherein the cyclic ester is present at from 0.5–5 moles per mole of hydroxyl group on the polymer component.

* * * * *